United States Patent
Lection et al.

(10) Patent No.: US 10,235,352 B2
(45) Date of Patent: *Mar. 19, 2019

(54) INDEPENDENT SUBMISSION OF FORMS IN A PORTAL VIEW

(71) Applicant: International Business Machines Corporation, Armonk, NY (US)

(72) Inventors: David B. Lection, Raleigh, NC (US); Eric L. Masselle, Wake Forest, NC (US); Mohamad R. Salahshoor, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/966,545

(22) Filed: Apr. 30, 2018

(65) Prior Publication Data
US 2018/0246870 A1    Aug. 30, 2018

Related U.S. Application Data

(63) Continuation of application No. 14/960,388, filed on Dec. 6, 2015, now Pat. No. 9,959,264, which is a
(Continued)

(51) Int. Cl.
*G06F 3/00* (2006.01)
*G06F 17/24* (2006.01)
*G06F 17/22* (2006.01)

(52) U.S. Cl.
CPC ........ *G06F 17/243* (2013.01); *G06F 17/2247* (2013.01)

(58) Field of Classification Search
CPC .................... G06F 17/2247; G06F 17/243
See application file for complete search history.

(56) References Cited

U.S. PATENT DOCUMENTS

| | | |
|---|---|---|
| 6,327,628 B1 | 12/2001 | Anuff et al. |
| 6,385,642 B1 | 5/2002 | Chlan |

(Continued)

FOREIGN PATENT DOCUMENTS

| | | |
|---|---|---|
| CN | 1892592 A | 1/2007 |
| CN | 101176095 A | 5/2010 |

(Continued)

OTHER PUBLICATIONS

"A process for the blending of web content," Research Disclosure 4321174, Apr. 2000, pp. 778-779.
(Continued)

*Primary Examiner* — Kyle R Stork
(74) *Attorney, Agent, or Firm* — Cuenot, Forsythe & Kim, LLC

(57) ABSTRACT

Embodiments of the present invention address deficiencies of the art in respect to processing forms submissions in a portal environment and provide a method, system and computer program product for independently refreshing a forms submission in a portal view. In one embodiment, a system for independently submitting forms in a portal view can include a portal server configured to render a portal view and a portlet aggregator coupled to the portal server. The portal aggregator can be configured to provide portlet markup for different portlets in the portal view where at least one of the different portlets includes a visible form includes one or more form elements.

15 Claims, 3 Drawing Sheets

Related U.S. Application Data continuation of application No. 11/170,981, filed on Jun. 30, 2005, now Pat. No. 9,218,329.

(56) References Cited

U.S. PATENT DOCUMENTS

| | | | |
|---|---|---|---|
| 6,567,843 B1 | 5/2003 | Schumacher |
| 6,677,964 B1 | 1/2004 | Nason et al. |
| 6,735,586 B2 | 5/2004 | Timmons |
| 6,738,804 B1 | 5/2004 | Lo |
| 7,130,812 B1 | 10/2006 | Iyer et al. |
| 7,146,563 B2 | 12/2006 | Hesmer et al. |
| 7,162,717 B1 | 1/2007 | Harris |
| 7,228,496 B2 | 6/2007 | Hamada |
| 7,349,968 B2 | 3/2008 | Johnson |
| 7,451,194 B2 | 11/2008 | Bowser et al. |
| 7,523,401 B1 | 4/2009 | Aldridge |
| 7,636,881 B2 | 12/2009 | Lection et al. |
| 7,640,512 B1 | 12/2009 | Appling |
| 7,756,982 B2 | 7/2010 | Johnson |
| 7,827,494 B1 | 11/2010 | Hedayatpour et al. |
| 8,214,731 B2 | 7/2012 | Lection et al. |
| 9,218,329 B2 | 12/2015 | Lection et al. |
| 9,959,264 B2 | 5/2018 | Lection et al. |
| 2002/0007321 A1 | 1/2002 | Burton |
| 2002/0087667 A1 | 7/2002 | Anderson |
| 2002/0124022 A1 | 9/2002 | Yoo |
| 2002/0138624 A1 | 9/2002 | Esenther |
| 2002/0198903 A1 | 12/2002 | Robison |
| 2003/0001888 A1 | 1/2003 | Power |
| 2003/0004272 A1 | 1/2003 | Power |
| 2003/0020671 A1 | 1/2003 | Santoro et al. |
| 2003/0126558 A1 | 7/2003 | Griffin |
| 2003/0145275 A1 | 7/2003 | Qian et al. |
| 2003/0149722 A1 | 8/2003 | Jolley et al. |
| 2003/0167315 A1 | 9/2003 | Chowdhry et al. |
| 2003/0167358 A1 | 9/2003 | Marvin et al. |
| 2003/0187956 A1 | 10/2003 | Belt et al. |
| 2003/0188163 A1 | 10/2003 | Fischer et al. |
| 2004/0003096 A1 | 1/2004 | Willis |
| 2004/0098451 A1 | 5/2004 | Mayo |
| 2004/0098467 A1 | 5/2004 | Dewey et al. |
| 2004/0111671 A1 | 6/2004 | Lu et al. |
| 2004/0122971 A1 | 6/2004 | Joshi et al. |
| 2004/0128620 A1 | 7/2004 | Lund |
| 2004/0199497 A1 | 10/2004 | Timmons |
| 2004/0199541 A1 | 10/2004 | Goldberg et al. |
| 2004/0205555 A1 | 10/2004 | Hind et al. |
| 2004/0230901 A1 | 11/2004 | Godwin et al. |
| 2004/0243928 A1 | 12/2004 | Hesmer et al. |
| 2005/0055634 A1 | 3/2005 | Burns et al. |
| 2005/0108034 A1 | 5/2005 | Musson et al. |
| 2005/0108574 A1 | 5/2005 | Haenel et al. |
| 2005/0108647 A1 | 5/2005 | Musson et al. |
| 2005/0108699 A1 | 5/2005 | Olander et al. |
| 2005/0187993 A1 | 8/2005 | Selman et al. |
| 2005/0188051 A1 | 8/2005 | Sneh |
| 2005/0256906 A1 | 11/2005 | Bales et al. |
| 2005/0257172 A1 | 11/2005 | Bales et al. |
| 2005/0262435 A1 | 11/2005 | Ramanujan |
| 2005/0283734 A1 | 12/2005 | Santoro et al. |
| 2006/0005137 A1 | 1/2006 | Jolley |
| 2006/0015846 A1 | 1/2006 | Fraleigh et al. |
| 2006/0034434 A1 | 2/2006 | Kashi |
| 2006/0041637 A1 | 2/2006 | Jerrard-Dunne |
| 2006/0069714 A1 | 3/2006 | Blount et al. |
| 2006/0080612 A1 | 4/2006 | Hayes et al. |
| 2006/0095676 A1 | 5/2006 | Dzierzon et al. |
| 2006/0129935 A1 | 6/2006 | Deinlein et al. |
| 2006/0195779 A1 | 8/2006 | McElroy et al. |
| 2006/0230062 A1 | 10/2006 | Roy-Chowdhury et al. |
| 2007/0005731 A1 | 1/2007 | Lection et al. |
| 2007/0006075 A1 | 1/2007 | Lection et al. |
| 2007/0006084 A1 | 1/2007 | Lection et al. |
| 2007/0055930 A1 | 3/2007 | Jerrard-Dunne et al. |
| 2007/0055942 A1 | 3/2007 | Hesmer et al. |
| 2007/0118794 A1 | 5/2007 | Hollander et al. |
| 2007/0233871 A1 | 10/2007 | Fletcher et al. |
| 2008/0134014 A1 | 6/2008 | Hind et al. |
| 2008/0270929 A1 | 10/2008 | Bohn et al. |
| 2012/0179985 A1 | 3/2012 | Lection et al. |
| 2016/0085737 A1 | 3/2016 | Lection et al. |

FOREIGN PATENT DOCUMENTS

| | | | |
|---|---|---|---|
| EP | 1899874 A1 | 3/2008 |
| JP | 2003006158 A1 | 1/2003 |
| JP | 2009500703 A | 1/2009 |
| JP | 4791542 B2 | 10/2011 |
| WO | 02084535 A1 | 10/2002 |
| WO | 2005013579 A1 | 2/2005 |
| WO | 2007003496 A1 | 1/2007 |
| WO | 2007003497 A1 | 1/2007 |

OTHER PUBLICATIONS

Pierce, M. et al., "Interoperable Web Services for Computational Portals," IEEE, Supercomputing, ACM/IEEE 2002 Conference, 13 pgs.

Ginsburg, M., "The Catacomb Project: Building a User-Centered Portal the Conversational Way," WIDM '02, Nov. 8, 2002, pp. 84-87.

Donnelly, V. et al., "Community Portals through Communitization," CUU '03, Nov. 10-11, 2003, pp. 9-14.

Bellas, F. et al., "A Flexible Framework for Engineering 'My' Portals," WWW 2004, May 17-22, 2004, pp. 234-242.

"How to Update Portlet Information Every X Seconds—Stock Ticker . . . Weather Updates . . . " Google Groups, Enterprise Portals & JSR 168 Portlets, Feb. 23, 2005, retrieved from the Internet: <http://groups.google.com/group/portlet/browse—thread/1bibb18b98516c2 . . . >, 3 pgs.

Ziebold, G. et al., "Asynchronous Rendering of Portlet Content with AJAX Technology," Sun Developer Network (SDN), Jun. 6, 2005, XP002397762 [retrieved Sep. 5, 2006] retrieved from the Internet: <http://developers.sun.com/prodtech/portalserver/reference/techart/asy nch_rendering.html>, 3 pgs.

Lupi, R., "Refreshing the Content," zope.org, [online] Oct. 7, 2004, [retrieved Sep. 5, 2006] retrieved from the Internet: <https://mail.zope.org/pipermail/zope/2004-October/153950.html>, 1 pg.

"Developing Portlets," [online] BEA Systems, Apr. 1, 2006 [retrieved Sep. 5, 2006] XP002397765, retrieved from the Internet: <e-docs.BEA.com>, 175 pgs.

"BEA Weblogic: Developing Portlets," [online] retrieved from the Internet: <http://e-docos.bea.com/wlcs/docs31/p13ndev/portlets.htm>, 11 pg.

"Optimizing and minimizing portlet round trips to a portal server," Research Disclosure 449086, vol. 449, No. 86, Sep. 2001, 3 pg.

Diaz et al., "Invoking Web Applications from Portals: Customisation Implications," In Adaptive Hypermedia and Adaptive Web-Based Systems, pp. 75-84. Springer Berlin Heidelberg, 2004.

Diaz et al., "Improving Portal Interoperability through Deep Annotation," ACM, May 2005, pp. 372-381.

Allan et al., "Portals and Portlets 2003," In Proc. NeSC Workshop, pp. 14-17. 2004.

Diaz et al., "Portal Syndication: Raising Variability Concerns," ACM, Nov. 2005, pp. 627-659.

Wang et al., "Portlet, WSRP and Application," In 2nd Int'l. Conf. on Semantics, Knowledge and Grid, SKG'06, IEEE, 2006, 55 pg.

Schaeck, "Web Services for Remote Portals (WSRP) Whitepaper," OASIS Web Services for Remote Portlets TC, Sep. 22, 2002, 18 pg.

Levy et al., "Improving Understanding of website Privacy Policies with Fine-Grained Policy Anchors," Proc. of 14th Int'l. Conf.on World Wide Web, ACM, 2005, pp. 480-488.

Woychowsky, 'Hidden Frames Facilitate Client-Side Caching,' Oct. 1, 2002, retrieved from the Internet: <http://articles.techrepublic.com.com/5100-10878_11-1044658.html>, pp. 1-3.

WIPO International Appln. PCT/EP2006/063283, International Search Report, dated Oct. 31, 2006, 3 pg.

(56) References Cited

OTHER PUBLICATIONS

WIPO International Appln. PCT/EP2006/063283, International Report on Patentability, dated Jan. 9, 2008, 7 pg.
WIPO International Appln. PCT/EP2006/063285, International Search Report, dated Sep. 21, 2006, 3 pg.
WIPO International Appln. PCT/EP2006/063285, International Report on Patentability, dated Jan. 9, 2007, 7 pg.
U.S. Appl. No. 11/170,916, Non-Final Office Action, dated Dec. 26, 2007, 10 pg.
U.S. Appl. No. 11/170,916, Final Office Action, dated May 12, 2008, 13 pg.
U.S. Appl. No. 11/170,916, Examiner's Answer to Appeal Brief, dated Jan. 22, 2009, 15 pg.
U.S. Appl. No. 11/170,916, Decision on Appeal, Oct. 7, 2011, 23 pg.
U.S. Appl. No. 11/170,916, Decision on Request for Rehearing, Dec. 2, 2011, 5 pg.
U.S. Appl. No. 11/170,916, Notice of Allowance, dated Feb. 29, 2012, 8 pg.
U.S. Appl. No. 11/171,120, Non-Final Office Action, dated Nov. 26, 2007, 9 pg.
U.S. Appl. No. 11/171,120, Non-Final Office Action, dated May 28, 2008, 10 pg.
U.S. Appl. No. 11/171,120, Final Office Action, dated Apr. 28, 2009, 5 pg.
U.S. Appl. No. 11/171,120, Notice of Allowance, dated Aug. 10, 2009, 4 pg.
U.S. Appl. No. 11/170,981, Non-Final Office Action, dated Feb. 8, 2008, 9 pg.
U.S. Appl. No. 11/170,981, Final Office Action, dated Jul. 29, 2008, 9 pg.
U.S. Appl. No. 11/170,981, Non-Final Office Action, dated Mar. 9, 2009, 8 pg.
U.S. Appl. No. 11/170,981, Final Office Action, dated Aug. 7, 2009, 11 pg.
U.S. Appl. No. 11/170,981, Non-Final Office Action, dated Apr. 2, 2010, 6 pg.
U.S. Appl. No. 11/170,981, Non-Final Office Action, Nov. 23, 2010, 9 pg.
U.S. Appl. No. 11/170,981, Final Office Action, dated Apr. 27, 2011, 11 pg.
U.S. Appl. No. 11/170,981, Examiners Answer to Appeal Brief, dated Aug. 10, 2011, 13 pg.
U.S. Appl. No. 11/170,981, Decision on Appeal, May 7, 2014, 15 pg.
U.S. Appl. No. 11/170,981, Decision on Request for Rehearing, Jul. 29, 2014, 5 pg.
U.S. Appl. No. 11/170,981, Final Office Action, dated Oct. 17, 2014, 9 pg.
U.S. Appl. No. 11/170,981, Non-Final Office Action, dated Feb. 26, 2015, 10 pg.
U.S. Appl. No. 11/170,981, Notice of Allowance, dated Aug. 14, 2015, 9 pg.
U.S. Appl. No. 13/424,882, Non-Final Office Action, dated Jul. 18, 2014, 13 pg.
U.S. Appl. No. 13/424,882, Final Office Action, dated Nov. 6, 2014, 13 pg.
U.S. Appl. No. 13/424,882, Examiner's Answer, dated Sep. 25, 2015, 13 pg.

INDEPENDENT SUBMISSION OF FORMS IN A PORTAL VIEW

BACKGROUND OF THE INVENTION

Field of the Invention

The present invention relates to the field of portal environment management and more particularly to refreshing portlet content within a portal view.

Description of the Related Art

Distributing content about large computer communications networks is not without its challenges. In particular, the quantity of content available for distribution in a computer communications network often varies proportionally to the size of the computer communications network. At the extreme, the Internet hosts a vast quantity of content not easily accessible by most end-users. Portals represent a sensible solution to the problem of aggregating content through a channel paradigm in a single, network-addressable location. In consequence, portals have become the rage in content distribution.

Portlets are the visible active components included as part of portal pages. Similar to the graphical windows paradigm of windowing operating systems, each portlet in a portal occupies a portion of the portal page through which the portlet can display associated content from a portlet channel. Portlets are known to include both simple applications such as an electronic mail client, and also more complex applications such as forecasting output from a customer relationship management system. The prototypical portlet can be implemented as server-side scripts executed through a portal server.

From the end-user perspective, a portlet is a content channel or application to which the end-user can subscribe. By comparison, from the perspective of the content provider, a portlet is a means through which content can be distributed in a personalized manner to a subscribing end-user. Finally, from the point of view of the portal, a portlet merely is a component which can be rendered within the portal page. In any case, by providing one or more individually selectable and configurable portlets in a portal, portal providers can distribute content and applications through a unified interface in a personalized manner according to the preferences of the end-user.

Portal servers are computer programs which facilitate the distribution of portal based Web sites on the public Internet or a private intranet. Importantly, it will be recognized by one of ordinary skill in the art that the signature characteristic of all conventional portal servers can include the aggregation of content from several portlet applications within a single distributable page in a uniform manner. To that end, each portlet application within the portal page can be represented by a portlet user interface distributed by the portal server to requesting client computing devices.

Portals display an aggregation of markup that can, and frequently does, incorporate forms that originate from multiple content sources. The performance and availability of any one of these sources can have a profound effect upon the end user experience with a portal, since the entire portal display must be aggregated prior to rendering the portal in a client viewer. Specifically, aggregation complicates the notion of refresh, and the Web based interface of a portal can compound matters further. In this regard, forms defined within portlets running in the portal view that process a submission cannot do so without interrupting the display of neighboring portlets. This type of interruption can be distracting and a source of frustration for the end user.

BRIEF SUMMARY OF THE INVENTION

Embodiments of the present invention address deficiencies of the art in respect to processing forms submissions in a portal environment and provide a novel and non-obvious method, system and computer program product for independently refreshing a forms submission in a portal view. In one embodiment, a system for independently submitting forms in a portal view can include a portal server configured to render a portal view and a portlet aggregator coupled to the portal server. The portlet aggregator can be configured to provide portlet markup for different portlets in the portal view where at least one of the different portlets includes a visible form includes one or more form elements.

The portlet aggregator can include logic enabled to generate a companion form for the visible form in a hidden frame. The hidden frame can include a script programmed to provide an updated view to the portlet aggregator for a corresponding one of the visible forms. The portlet aggregator can be enabled to write logic to update form elements in the companion form with data from corresponding form elements in the visible form. Finally, the portlet aggegator further can be enabled to write logic to submit the companion form in response to a request to submit the visible form. Notably, the logic enabled to update form elements in the companion form with data from corresponding form elements in the visible form can include script logic disposed in the at least one of the different portlets comprising a visible form. In this regard, the script logic can be further enabled to submit the companion form in response to a request to submit the visible form.

A method for independently submitting forms in a portal view can include generating a companion form in a hidden frame for a visible form, updating form elements in the companion form with data from corresponding form elements in the visible form, and submitting the companion form in response to a request to submit the visible form. Generating a companion form in a hidden frame for a visible form can include generating a companion form in a hidden frame associated with a portlet in the portal view for a visible form disposed in the portlet in the portal view. The method further can include receiving an updated view in response to the submitting and providing the updated view to the portlet for display in the portal view.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for independent submission of forms in a portal view. In accordance with an embodiment of the present invention, element data within a form in a portlet within a portal view can be copied to a companion form in a hidden frame for the portlet. Subsequently, the companion form within the hidden frame can be submitted for processing. A resulting view can be provided in consequence of the submission and the resulting view can be rendered in the portlet within the portal view. In this way, the submission of the form in the portlet in the portal view need not disturb the presentation of other portlets in the portal view.

Figure 1:
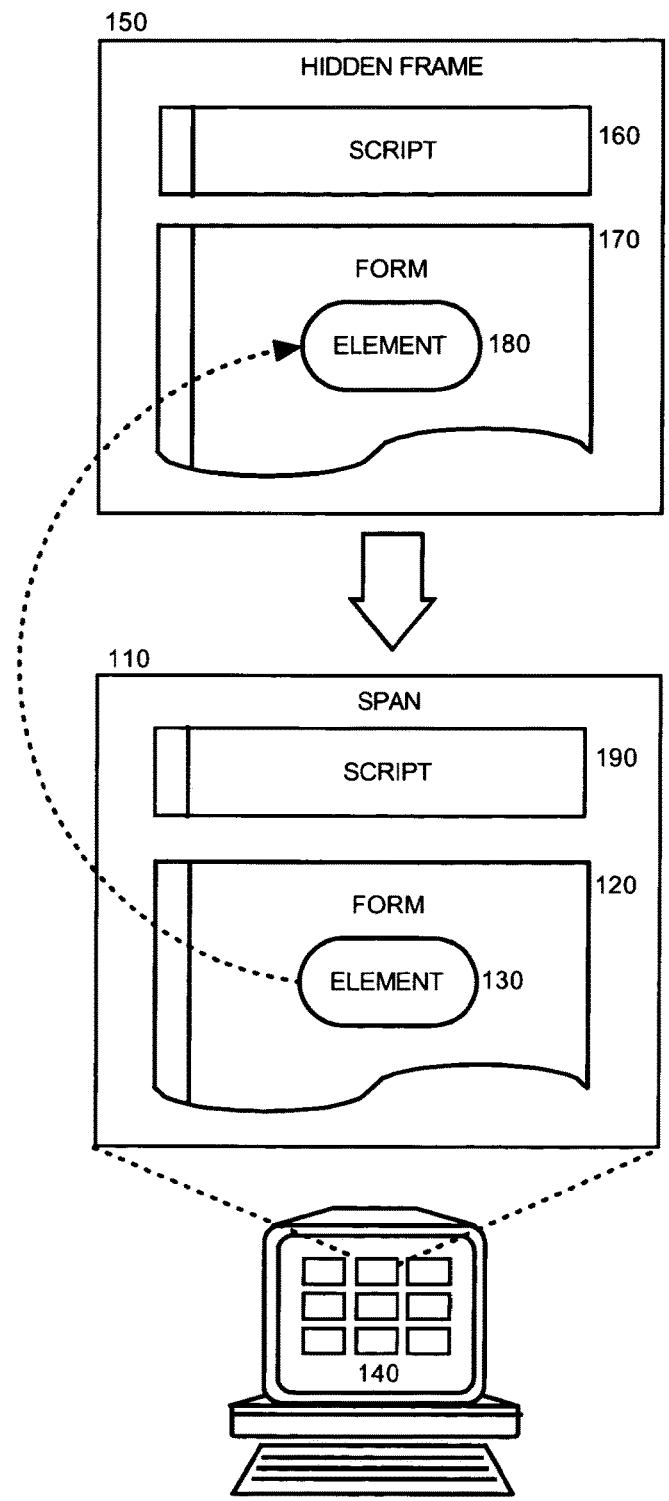
FIG. 1 is a pictorial illustration of form defined within portlet markup configured to accommodate independent form submission in a portal view.

In more particular illustration, FIG. 1 is a pictorial illustration of form defined within portlet markup configured to accommodate independent form submission in a portal view. As shown in FIG. 1, a visible portion of a portlet 110 can be defined within a portal view 140. The visible portion of the portlet 110 can include a form 120 having one or more form elements 130, for instance text entry fields, radio buttons, check boxes, drop-down boxes, and the like. In addition to the visible portion of a portlet 110, a hidden frame 150 for the portlet 110 can be defined. The hidden frame 150 can include a companion form 170 to the form 120 in the visible portion of the portlet 110. In this regard, the companion form 170 in the hidden frame 150 can include one or more form elements 180 which correspond to the elements 130 in the form 120 of the visible portion of the portlet 110.

In operation, in response to the activation of a submission request for the form 120, script logic 190 disposed in the visible portion of the portlet can copy the values for the elements 130 of the form 120 to corresponding elements 180 in the companion form 170 of the hidden frame 150. Subsequently, a submission request for the form 170 can be requested. A resulting view can be provided by the script logic 160 for rendering in the visible portion of the portlet 110. In this way, the form 120 within the visible portion of the portlet 110 can be submitted without disturbing the presentation of other forms in other portlets in the portal view 140.

Figure 2:
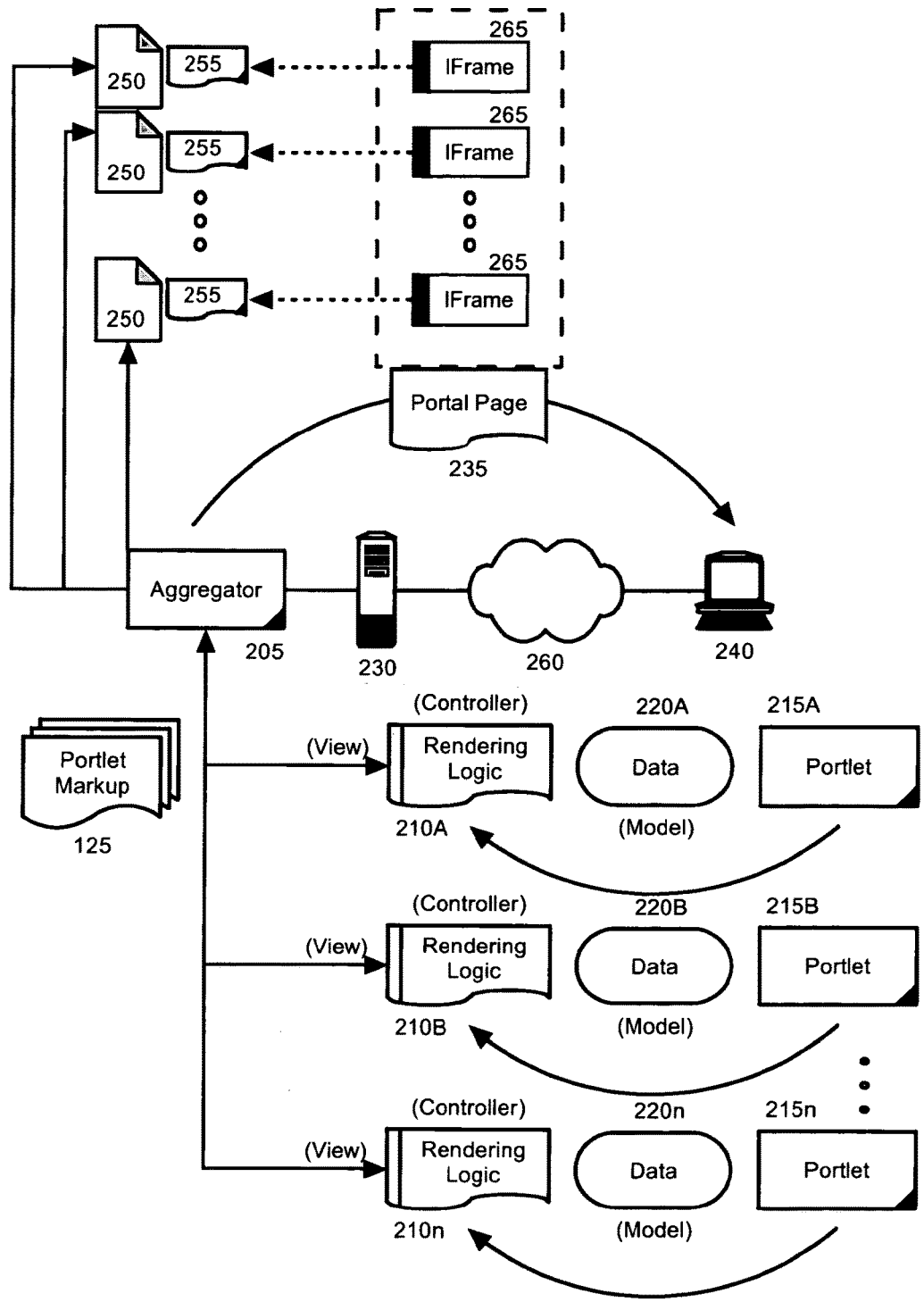
FIG. 2 is a schematic illustration of a portal environment configured to accommodate the independent form submission in a portal view; and, FIG. 3 is a flow chart illustrating a method for independent form submission in a portal view.

In more particular illustration, FIG. 2 is a schematic illustration of a portal environment configured to accommodate the independent form submission in a portal view. The portal server system can include a portal view 235 communicatively coupled to a selection of portlet applications 215A, 215B, 215n through a portal server 230. Each portlet application 215A, 215B, 215n can produce a portlet view based upon portlet data 220A, 220B, 220n in the form of portlet markup 225 through corresponding rendering logic 210A, 210B, 210n. Notably, the rendering logic 210A, 210B, 210n can be active markup such as a JSP, in which logical scriptlets can be embedded to produce specific markup language tags.

A portlet aggregator 205 can be coupled to each portlet application 215A, 215B, 215n to receive the portlet markup 225 and to aggregate the portlet markup 225 into view in the portal view 235. By aggregation, it is meant that the individual markup language blocks produced by each portlet application 215A, 215B, 215n can be combined into a single cohesive markup language document configured for distribution to and use within a conventional content browser. In this regard, the portal view 235 can be disposed in the portal server 230 from which the portal view 235 can be accessed by client content browsing devices 240 over a computer communications network 260 such as a local computer communications network, for instance a private intranet, or a global computer communications network, for instance the public Internet.

In accordance with an embodiment of the present invention, the portlet aggregator 205 can include logic to generate and manage companion forms 250 for forms defined by individual ones of the portlet applications 215A, 215B, 215n. The companion forms 250 can be generated within hidden frames 265 in the portal view 235. Moreover, the companion forms 250 can receive the data provided to the forms defined by the individual ones of the portlet applications 215A, 215B, 215n.

The logic of the aggregator 205 further can include script logic 255 within the hidden frames 265 to manage the submission of the companion forms 250 in lieu of corresponding forms defined by the individual ones of the portlet applications 215A, 215B, 215n. In this way, while end users interacting with the forms defined by the individual ones of the portlet applications 215A, 215B, 215n can request the submission of any one of the forms, the companion forms 250 within the hidden frames 265 can execute and manage the submission in response to the request in lieu of the forms defined by the individual ones of the portlet applications 215A, 215B, 215n.

Figure 3:
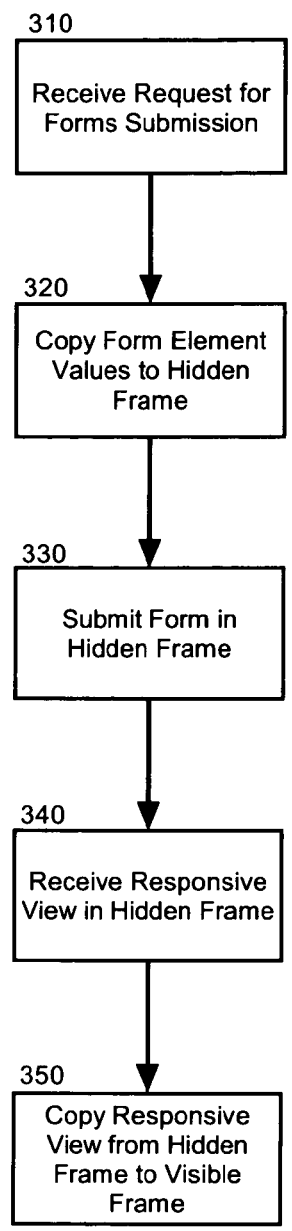

In yet further illustration, FIG. 3 is a flow chart illustrating a method for independent form submission in a portal view. Beginning in block 310, a request can be received for a forms submission for a form defined within a visible portion of a portlet in a portal view. In block 320, the values for different form elements in the form can be copied to corresponding elements for a companion form defined within a hidden frame associated with the portlet. Subsequently, in block 330 the companion form can be submitted for processing lieu of the form in the visible portion of the portlet. In block 340, an update to the companion form can be received which update can be provided for rendering in the visible portion of the portlet in block 350.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A computer-implemented method performed within and by a portal server system, comprising:
   receiving, from a client computer, a request for a portal including a visible form;
   transmitting, to the client computer, portlet markup corresponding to the portal; and
   receiving, from the client computer, input from a companion form, wherein
   the portlet markup transmitted to the client computer includes
      a visible form element configured to receive any one of a plurality of inputs and
      a hidden frame including the companion form having a form element corresponding to the visible form element, and
   the form element in the companion form is updated upon an input for the visible form element being received within the visible form.

2. The method of claim 1, wherein
an update is received within the hidden frame and in response to the submitted companion form, and
the portlet is modified using the update.

3. The method of claim 1, wherein
the portlet is within a portal view,
the portal view includes a plurality of portlets, and
each of the plurality of portlets includes a hidden frame.

4. The method of claim 1, wherein
the hidden frame includes script logic configured to manage the submitting of the companion form.

5. The method of claim 1, wherein
the updating of the form element within the companion form includes copying the input for the visible form element to the form element within the companion form.

6. A portal server system, comprising:
   at least one hardware processor configured to initiate the following executable operations:
      receiving, from a client computer, a request for a portal including a visible form;
      transmitting, to the client computer, portlet markup corresponding to the portal; and
      receiving, from the client computer, input from a companion form, wherein the portlet markup transmitted to the client computer includes
         a visible form element configured to receive any one of a plurality of inputs and
         a hidden frame including the companion form having a form element corresponding to the visible form element, and
      the form element in the companion form is updated upon an input for the visible form element being received within the visible form.

7. The system of claim 6, wherein
an update is received within the hidden frame and in response to the submitted companion form, and
the portlet is modified using the update.

8. The system of claim 6, wherein
the portlet is within a portal view,
the portal view includes a plurality of portlets, and
each of the plurality of portlets includes a hidden frame.

9. The system of claim 6, wherein
the hidden frame includes script logic configured to manage the submitting of the companion form.

10. The system of claim 6, wherein
the updating of the form element within the companion form includes copying the input for the visible form element to the form element within the companion form.

11. A computer program product, comprising:
    a hardware storage device having stored therein computer usable program code, which when executed by a portal server system, causes the portal server system to perform:
       receiving, from a client computer, a request for a portal including a visible form;
       transmitting, to the client computer, portlet markup corresponding to the portal; and
       receiving, from the client computer, input from a companion form, wherein the portlet markup transmitted to the client computer includes
          a visible form element configured to receive any one of a plurality of inputs and
          a hidden frame including the companion form having a form element corresponding to the visible form element, and
       the form element in the companion form is updated upon an input for the visible form element being received within the visible form.

12. The computer program product of claim 11, wherein
an update is received within the hidden frame and in response to the submitted companion form, and
the portlet is modified using the update.

13. The computer program product of claim 11, wherein
the portlet is within a portal view,
the portal view includes a plurality of portlets, and
each of the plurality of portlets includes a hidden frame.

14. The computer program product of claim 11, wherein
the hidden frame includes script logic configured to manage the submitting of the companion form.

15. The computer program product of claim 11, wherein
the updating of the form element within the companion form includes copying the input for the visible form element to the form element within the companion form.

* * * * *